United States Patent
Harknett et al.

(10) Patent No.: US 11,047,297 B2
(45) Date of Patent: Jun. 29, 2021

(54) FUEL SWITCHOVER CONTROL SYSTEM FOR A MULTI-FUEL GENERATOR

(71) Applicant: CLARK EQUIPMENT COMPANY, Statesville, NC (US)

(72) Inventors: Nicholas Harknett, Statesville, NC (US); Chinmay Bhatt, Statesville, NC (US)

(73) Assignee: CLARK EQUIPMENT COMPANY, Statesville, NC (US)

( * ) Notice: Subject to any disclaimer, the term of this patent is extended or adjusted under 35 U.S.C. 154(b) by 0 days.

(21) Appl. No.: 16/164,515

(22) Filed: Oct. 18, 2018

(65) Prior Publication Data
US 2020/0123972 A1    Apr. 23, 2020

(51) Int. Cl.
F02B 69/04 (2006.01)
F02B 63/04 (2006.01)
H02K 7/18 (2006.01)

(52) U.S. Cl.
CPC .............. *F02B 69/04* (2013.01); *F02B 63/04* (2013.01); *H02K 7/1815* (2013.01)

(58) Field of Classification Search
CPC ...... F02D 19/06; F02D 19/0647; F02B 43/00; F02B 43/047; F02B 63/04; F02B 69/04; F02M 21/02; F02M 21/0215; H02K 7/18; H02K 7/1815
USPC ..................... 123/525–527, 575–577, 27 GE
See application file for complete search history.

(56) References Cited

U.S. PATENT DOCUMENTS

| | | | |
|---|---|---|---|
| 2005/0233856 A1* | 10/2005 | Endo | B60K 6/365 477/93 |
| 2011/0023853 A1* | 2/2011 | Lund | F02D 19/0647 123/590 |
| 2012/0186560 A1* | 7/2012 | Lund | F02D 19/0642 123/495 |
| 2012/0210988 A1* | 8/2012 | Willi | F02D 19/024 123/575 |
| 2014/0238340 A1 | 8/2014 | Dunn et al. | |
| 2015/0122230 A1* | 5/2015 | Sarder | F02D 19/0647 123/525 |
| 2016/0010569 A1 | 1/2016 | Dunn et al. | |
| 2016/0290247 A1* | 10/2016 | Bhatt | F02D 19/0615 |

(Continued)

FOREIGN PATENT DOCUMENTS

EP    3351777 A1    7/2018

OTHER PUBLICATIONS

International Search Report and Written Opinion dated Feb. 6, 2020 for related International Application No. PCT/US2019/055904 (13 pages).

*Primary Examiner* — John Kwon
*Assistant Examiner* — Johnny H Hoang
(74) *Attorney, Agent, or Firm* — Michael Best & Friedrich LLP (57) ABSTRACT

A movable electrical generation system includes a generator operable to produce a supply of electrical energy, a prime mover operable to drive the generator, a first fuel, a second fuel different from the first fuel, and a fuel selector valve assembly operable to selectively deliver the first fuel and the second fuel to the prime mover, wherein in response to a transition from delivery of the first fuel to the prime mover to delivery of the second fuel to the prime mover, both the first and second fuels are delivered to the prime mover before cessation of delivery of the first fuel.

20 Claims, 5 Drawing Sheets

(56) References Cited

U.S. PATENT DOCUMENTS

| | | |
|---|---|---|
| 2017/0022910 A1 | 1/2017 | Collie et al. |
| 2017/0037796 A1* | 2/2017 | Collie ................. F02D 41/0025 |
| 2018/0080392 A1* | 3/2018 | Janscha .............. F02M 21/0218 |

* cited by examiner

FUEL SWITCHOVER CONTROL SYSTEM FOR A MULTI-FUEL GENERATOR

FIELD

The present disclosure relates to a generator system. More specifically, the disclosure relates to a mobile generator system fueled by multiple, different fuel sources, and an associated fuel switchover control system that reduces electrical load interruption during transitions between different fuel sources.

BACKGROUND

A mobile generator is generally known in the art. The mobile generator is a portable device configured to produce electricity. The mobile generator is often powered by an engine. In some mobile generators, the engine can be configured to operate using multiple, different fuel sources. However, transitions between fuel sources can impact performance of the mobile generator. For example, when transitioning between fuel sources, the mobile generator can encounter an underdamped engine speed and/or a dropped electrical load. This can adversely disrupt applications powered by the mobile generator.

SUMMARY

In one embodiment, the disclosure provides a movable electrical generation system that includes a generator operable to produce a supply of electrical energy, a prime mover operable to drive the generator, a first fuel, a second fuel different from the first fuel, and a fuel selector valve assembly operable to selectively deliver the first fuel and the second fuel to the prime mover, wherein in response to a transition from delivery of the first fuel to the prime mover to delivery of the second fuel to the prime mover, both the first and second fuels are delivered to the prime mover before cessation of delivery of the first fuel.

In another embodiment, the disclosure provides a method of controlling a supply of one of a plurality of different fuel sources to a movable electrical generation system that includes supplying one of a first fuel and a second fuel to a prime mover as a selected fuel, the first fuel being different than the second fuel, and transitioning from the first fuel as the selected fuel to the second fuel as the selected fuel by concurrently providing the first fuel and the second fuel to the prime mover before terminating the supply of the first fuel.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
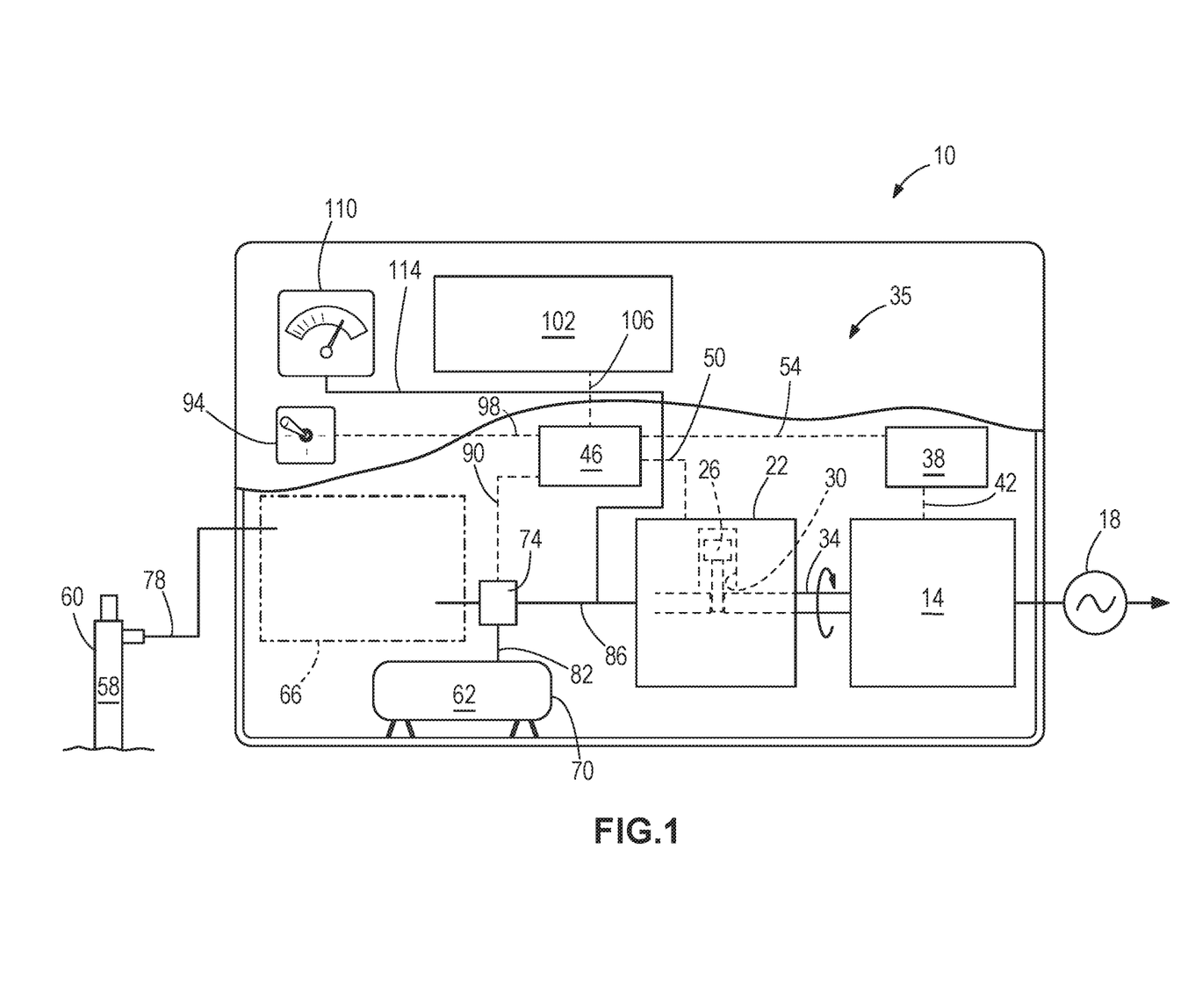
FIG. 1 is a schematic view of an embodiment of a multi-fuel mobile generator system.

FIG. 1 illustrates a schematic view of an embodiment of a multi-fuel mobile generator system 10 (or mobile generator 10 or mobile electrical generation system 10). The system 10 is configured to be movable to a desired (or targeted) location for the generation of electricity (or electrical power). The system 10 is also configured to be operated by a plurality of different fuels (or fuel sources or multiple fuels).

The system 10 includes a generator 14. The generator 14 is operable to output electrical power 18. The electrical power 18 can be a single phase or three phase alternating current (AC) electrical power at a desired voltage and frequency. The generator 14 can also include one or more transformers (not shown) to facilitate an output of current at multiple desired voltages. In another example of embodiments, the generator 14 is configured to provide electrical power 18 as a direct current (DC) power supply at a desired voltage.

A prime mover 22 is operably connected to the generator 14. The prime mover 22 is an engine 22, and more specifically a reciprocating piston engine (e.g., an internal combustion, compression-ignition engine, etc.). As such, the engine 22 can include at least one piston 26 positioned in an associated cylinder 30. The at least one piston 26 (or a plurality of pistons 26) is configured to reciprocate in the associated cylinder 30 to rotate a drive shaft 34. The drive shaft 34 is coupled to the generator 14, and rotation of the drive shaft 34 drives the generator 14 to produce electrical power 18. While the illustrated embodiment depicts the prime mover 22 as a reciprocating piston internal combustion engine, in other embodiments, the prime mover 22 can be any engine suitable to drive the generator 14.

A control system 35, in one embodiment, includes a generator controller 38 that is operably connected to the generator 14 by a first communication link 42 and an engine controller 46 that is operably connected to the engine 22 by a second communication link 50. The engine controller 46 is also in communication with the generator controller 38 by a third communication link 54. Each communication link 42, 50, 54 can be wired link, a wireless link, a communication bus, or any other suitable communication device for the transfer of data, commands, and/or other information between components. It should also be appreciated that the combination of the generator 14 and the engine 22, and the associated components, can be referred to as a generator set (or genset). In other examples of embodiments of the system 10, the generator controller 38 and the engine controller 46 of control system 35 can be incorporated into a single controller that includes the functionality of each separate controller 38, 46 as described herein.

The engine 22 is configured to operate using a plurality of different fuels. More specifically, the engine 22 is configured to operate using a first fuel 58 and a second fuel 62. While the illustrated embodiment illustrates two different fuel sources 58, 62, in other embodiments the engine 22 is configured to operate using three or more different fuels (or fuel sources).

With continued reference to FIG. 1, the first fuel 58 (or first fuel supply 58) is provided from a first fuel source 60. In the illustrated embodiment, the first fuel 58 is natural gas, and more specifically natural gas from a wellhead 60 (or wellhead natural gas). Wellhead natural gas is generally supplied at an unregulated pressure, is unfiltered, is potentially wet (or have a high percentage of moisture), and can be referred to as raw wellhead natural gas (or unclean natural gas). Wellhead natural gas in an unclean state can be treated by a scrubbing system 66 to prepare the wellhead natural gas for combustion in the engine 22. Accordingly, wellhead natural gas generally cannot be used in the same manner as pipeline natural gas. More specifically, wellhead natural gas is generally first treated (or cleaned) by the scrubbing system 66 to prepare the natural gas 58 for combustion in the engine 22. In other embodiments, the first fuel 58 can be pipeline natural gas, which is generally already treated or cleaned and in condition for combustion in the engine 22. Accordingly, in embodiments of the system 10 using pipeline natural gas as the first fuel 58, treatment by the scrubbing system 66 can be optional. While natural gas is one example of the first fuel 58, in other embodiments, the first fuel 58 can include propane, liquid propane, gasoline, diesel, kerosene, or any other suitable fuel. An example of the scrubbing system 66, associated components, and operation is disclosed in U.S. patent application Ser. No. 15/947,440, filed on Apr. 27, 2018 and entitled "ADAPTIVE GENERATOR PROTECTION SYSTEM," the contents of which is hereby incorporated by reference in its entirety.

The second fuel 62 (or second fuel supply 62) is provided from a second fuel source 70. In the illustrated embodiment, the second fuel 62 is liquid propane. The liquid propane is stored in a storage tank 70, which can be positioned onboard the system 10, or external to the system 10. In other embodiments, the second fuel 62 can include natural gas, gasoline, diesel, kerosene, or any other suitable fuel that is different from the first fuel 58.

The first fuel source 60 is fluidly connected to a fuel selector valve assembly 74 by a first fuel supply line 78. The first fuel supply line 78 facilitates a supply of the first fuel 58 from the first fuel source 60 to the fuel selector valve assembly 74. The scrubbing system 66 can be positioned in the first fuel supply line 78 downstream of the first fuel source 60 (e.g., the wellhead, etc.) and upstream of the fuel selector valve assembly 74. The second fuel source 70 is fluidly connected to the fuel selector valve assembly 74 by a second fuel supply line 82. The second fuel supply line 82 facilitates a supply of the second fuel 62 from the second fuel source 70 to the fuel selector valve assembly 74. The fuel selector valve assembly 74 is fluidly connected to the engine 22 by a fuel line 86.

The fuel selector valve assembly 74 is in communication with the engine controller 46 by a fourth communication link 90. The fourth communication link 90 can be substantially the same as the first, second, and third communication links 42, 50, 54. The engine controller 46 is configured to automatically select the appropriate fuel 58, 62 (or fuel source 60, 70) to fuel operation of the engine 22. In the illustrated embodiment, the first fuel 58 is monitored and delivered to the engine 22 at a first operating pressure range, while the second fuel 62 is monitored and delivered to the engine 22 at a second operating pressure range. The operating pressure ranges are selected and controlled such that they do not overlap, but fall within a pressure that is suitable for use by the engine 22. Thus, the first operating pressure range is separate and different than the second operating pressure range. In the illustrated example, the first fuel 58 (e.g., natural gas) operating pressure range is between approximately 8.0 and 11.5 inches of water, while the second fuel 62 (e.g., propane) operating pressure range is between approximately 11.5 and 14.0 inches of water. In other embodiments, the actual operating pressure ranges for the fuels can differ based on the fuels or fuel sources.

The engine controller 46 is configured to receive a signal indicative of a measured first fuel pressure and a measured second fuel pressure, which is respectively measured upstream of the fuel selector valve assembly 74. The engine controller 46 can use these measured pressure values to responsively actuate the fuel selector valve assembly 74 and supply the desired fuel 58, 62. For example, if both measured pressures are within their desired operating pressure ranges, the engine controller 46 can select either fuel 58, 62. Generally, the engine controller 46 will have a preprogrammed default fuel 58, 62 (or default fuel source 60, 70). In the illustrated embodiment, the first fuel 58 (e.g., natural gas, etc.) is the default fuel. As such, the engine controller 46 selects the default fuel for use, and actuates the fuel selector valve assembly 74 to a first position. However, if one measured pressure is outside of its operating pressure range (e.g., the first fuel 58 or the second fuel 62), the engine controller 46 can automatically select the other fuel 62, 58 that is in its operating pressure range. For example, if the pressure value of the selected fuel 58, 62 is outside of its operating pressure range, the engine controller 46 can automatically select the other fuel 62, 58 that is in its operating pressure range. As such, the engine controller 46 actuates the fuel selector valve assembly 74 to the suitable position (e.g., the first position, the second position, etc.) to supply the desired fuel that is within its operating pressure range.

The engine controller 46 can also include a manual override of the automatic fuel selection. A fuel selector switch 94 is operably connected to the engine controller 46 by a fifth communication link 98. The fifth communication link 98 can be substantially the same as the first, second, third, and fourth communication links 42, 50, 54, 90. The fuel selector switch 94 allows a user to override the automatic fuel selection decision by the engine controller 46. In the illustrated embodiment, the fuel selector switch 94 is a three-position toggle switch. In a first position, the fuel selector switch 94 sends a signal to the engine controller 46 by the fifth communication link 98 that overrides the automatic fuel selection decision and forces the use of the first fuel 58. In a second position, the fuel selector switch 94 sends a signal to the engine controller 46 by the fifth communication link 98 that overrides the automatic fuel selection decision and forces the use of the second fuel 62. In a third position, the fuel selector switch 94 sends a signal to the engine controller 46 by the fifth communication link 98 that allows the engine controller 46 to make the automatic fuel selection decision based on the measured pressure of the respective fuel 58, 62 (or fuel source 60, 70) in view of the associated operating pressure range. The engine controller 46 generally identifies and/or stores the selected fuel 58, 62 for delivery to the engine 22 (e.g., either by the automatic selection based on pressure or the manual override) as a current fuel source.

The engine controller 46 is also in operable communication with a user interface system 102 by a sixth communication link 106. The sixth communication link 106 can be substantially the same as the first, second, third, fourth, and fifth communication links 42, 50, 54, 90, 98. The user interface system 102 can include a control panel that allows a user to input commands, and monitor output signals. For example, an input command can include, but is not limited to, a system start signal, a system stop signal, and/or a voltage setting for the generator 14. An output signal can include, but is not limited to, a voltage indication, a frequency indication, system and/or equipment temperatures, operating speed, and/or warning indicators.

A fuel indicator 110 can identify to a user the selected fuel 58, 62 being supplied to the engine 22. The fuel indicator 110 is fluidly connected to the fuel line 86 by a pressure line 114. The fuel indicator 110 can be a mechanical pressure gauge (e.g., a Bourdon pressure gauge, etc.) that measures the pressure of the selected fuel 58, 62. An example of a suitable fuel indicator 110 is disclosed in pending U.S. patent application Ser. No. 14/679,570, the contents of which is hereby incorporated by reference in its entirety.

Figure 2:
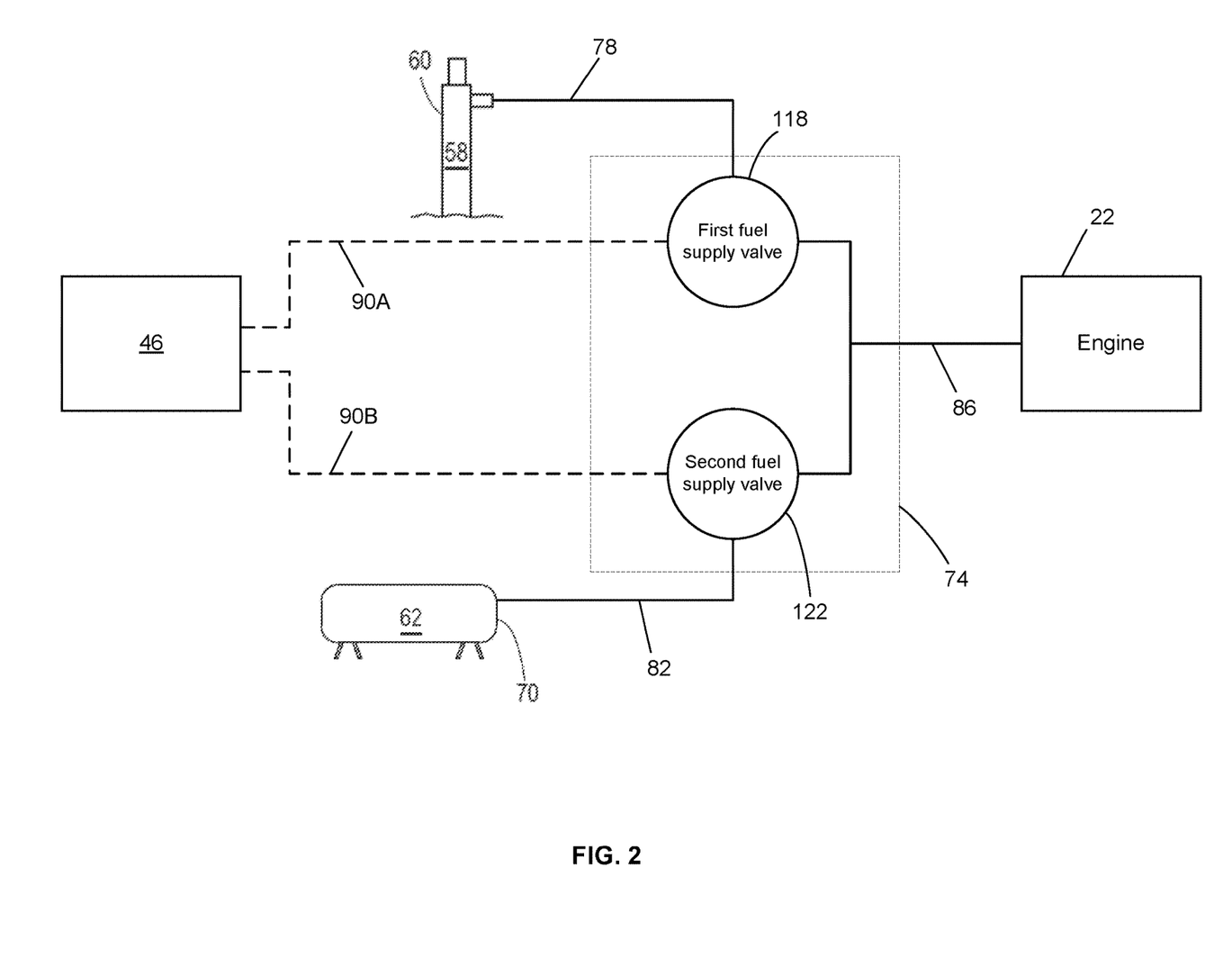
FIG. 2 is a schematic view of a fuel selector valve assembly for use with the multi-fuel mobile generator system of FIG. 1.

With reference now to FIG. 2, the fuel selector valve assembly 74 is illustrated in greater detail. The fuel selector valve assembly 74 includes a first fuel supply valve 118 and a second fuel supply valve 122. The first fuel supply valve 118 is fluidly connected to the first fuel source 60 by the first fuel supply line 78. The second fuel supply valve 122 is fluidly connected to the second fuel source 70 by the second fuel supply line 82. The first and second fuel supply valves 118, 122 are both fluidly connected to the engine 22 by the fuel line 86. The engine controller 46 is operably connected to the first fuel supply valve 118 by a first portion of the fourth communication link 90A. The engine controller 46 is operably connected to the second fuel supply valve 122 by a second portion of the fourth communication link 90B. It should be appreciated that the first and second portions of the fourth communication link 90A, 90B can be any suitable link to provide a command to the respective valves 118, 122.

Each of the first and second fuel supply valves 118, 122 are movable to place the fuel selector valve assembly 74 in at least a first position and a second position. In the first position, the fuel selector valve assembly 74 allows flow of the first fuel 58 from the first fuel source 60 to the engine 22 through the fuel line 86, and inhibits flow of the second fuel 62 from the second fuel source through the fuel line 86. As such, the first fuel supply valve 118 is in an open position, and the second fuel supply valve 122 is in a closed position. In the second position, the fuel selector valve assembly 74 allows flow from of the second fuel 62 from the second fuel source 70 to the engine 22 through the fuel line 86, and inhibits flow of the first fuel 58 from the first fuel source 60 through the fuel line 86. As such, the first fuel supply valve 118 is in a closed position, and the second fuel supply valve 122 is in an open position. While the illustrated first and second fuel supply valves 118, 122 are each a solenoid valve, in examples of other embodiments, the first and second fuel supply valves 118, 122 can be any suitable valve for selecting and/or inhibiting flow of at least the first and second fuels 58, 62.

Figure 3:
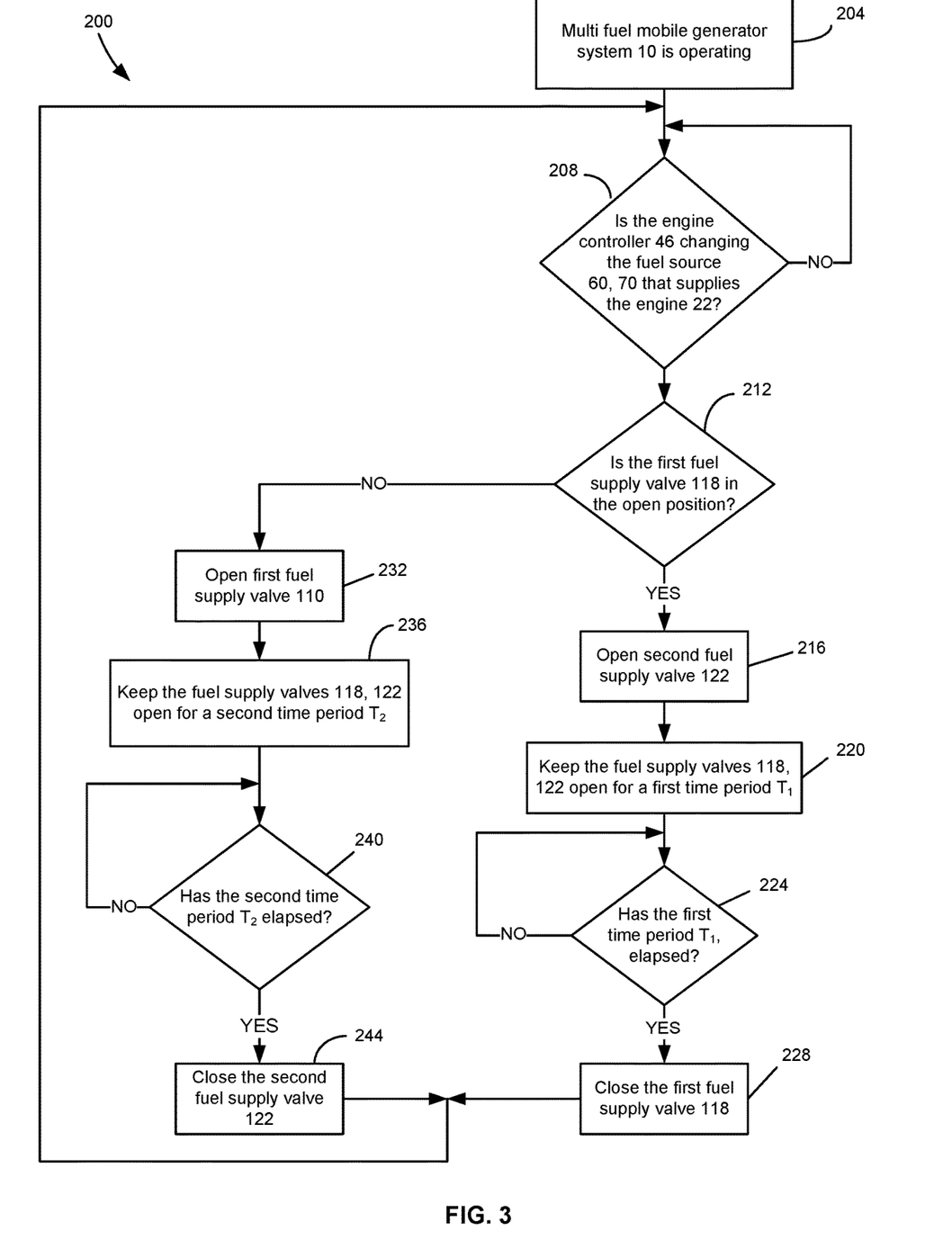
FIG. 3 is a flow diagram of a system for a fuel switchover control system for use with the multi-fuel mobile generator system of FIG. 1.

FIG. 3 illustrates a fuel switchover control system 200 for use with the multi-fuel mobile generator system 10. The system 200 includes a series of processing instructions or steps that are depicted in flow diagram form. The fuel switchover control system 200 improves operational stability of the generator system 10 during a fuel source 60, 70 supply transition period to the engine 22. More specifically, during the transition between fuel source 60, 70 supply to the engine 22, the system 200 maintains a flow of multiple fuel sources 60, 70 for a programmable period of time. This overlap of fuel supply from the fuel sources 60, 70 reduces the risk of fuel supply interruption caused by synchronized opening and closing of the valves 118, 122 at the same moment in time, smoothing engine 22 performance during the transition between fuel source 60, 70 supply. This in turn reduces the risk of encountering an underdamped engine speed and/or a dropped electrical load during the fuel source 60, 70 supply transition, reducing the risk of adverse disruptions to applications powered by the mobile generator system 10.

With reference to FIG. 3, the system 200 begins at step 204, where the generator system 10 is operational. For example, the engine 22 is operating and driving the generator 14 to produce electrical power. The engine 22 receives one of the plurality of fuel sources 60, 70 to operate the engine 22. The engine controller 46 also recognizes (or identifies) the selected fuel source 60, 70 from the plurality of fuel sources 60, 70. For example, the engine controller 46 can identify the selected fuel source 60, 70 from one or more of detecting the position of the fuel selector valve assembly 74 (e.g., in the first position, the second position, etc.), detecting the selected fuel from the automatic fuel selection process (e.g., pressure detection of fuel source, etc.), and/or detecting the selected fuel from the fuel selector switch 94 (e.g., the manual override of the automatic fuel selection, etc.). The identified selected fuel source 58, 62 can be locally stored (or logged or saved) by the engine controller 46.

Next at step 208, the system 200 determines whether the engine controller 46 is changing the fuel source 60, 70 that supplies the engine 22. For example, the engine controller 46 can responsively change one fuel source 60, 70 to another fuel source 70, 60 (or one fuel source 70, 60 to another fuel source 60, 70) in response to one or more conditions, such as those previously discussed (e.g., in response to an automatic pressure based selection, in response to a manual override selection, etc.). If the engine controller 46 is not changing the fuel source 60, 70 that supplies the engine 22, or determines "no," the process returns to step 208 and repeats (or otherwise awaits a change in the fuel source 60, 70). If the engine controller 46 is changing the fuel source 60, 70 that supplies the engine 22, or determines "yes," the process proceeds to step 212.

The system 200 next determines the fuel source 60, 70 (or fuel 58, 62) that is currently (or presently) being supplied to the engine 22. Stated another way, the system 200 determines the fuel 58, 62 that is being supplied to the engine 22 and that will be transitioned away from. For example, at step 212 the system 200 determines whether the first fuel supply valve 118 is in the open position, which indicates that the first fuel 58 is being supplied to the engine. If the system 200 determines that the first fuel supply valve 118 is in the open position, or "yes," the system 200 proceeds to step 216.

At step 216, the system 200 opens the second fuel supply valve 122. For example, the engine controller 46 communicates with the second fuel supply valve 122 along the second portion of the fourth communication link 90B, instructing the second fuel supply valve 122 to open. Next, at step 220 the system 200 keeps the fuel supply valves 118, 122 in an open position. In this position, both the first and second fuels 58, 62 are concurrently being supplied to the engine 22. The fuel supply valves 118, 122 are kept open for a first time period $T_1$. The first time period $T_1$ is a programmable (or preprogrammed) time period that is used to measure the amount of time that the fuel supply valves 118, 122 overlap in the open position (or overlap in the concurrent supply of the first and second fuels 58, 62 to the engine 22). The first time period $T_1$ can be at least one second to at least five seconds, and more specifically at least one second to at least three seconds, and more specifically three seconds, and more specifically at least one second. At step 224, the system 200 determines whether the first time period $T_1$ has elapsed. If "no," the amount of time in the first time period $T_1$ has not elapsed, the process returns to step 224 (or repeats). If "yes," the amount of time in the first time period $T_1$ has elapsed, the process proceeds to step 228.

At step 228, the system 200 closes the first fuel supply valve 118. For example, the engine controller 46 communicates with the first fuel supply valve 118 along the first portion of the fourth communication link 90A, instructing the first fuel supply valve 118 to close. Following step 228, the first fuel supply valve 118 is closed, the second fuel supply valve 122 is open, and only the second fuel 62 (or fuel from the second fuel source 70) is being supplied to the engine 22, resulting in cessation of supply (or delivery) of the first fuel 58 to the engine 22. The system 200 then returns to step 208 where the system repeats.

Figure 4:
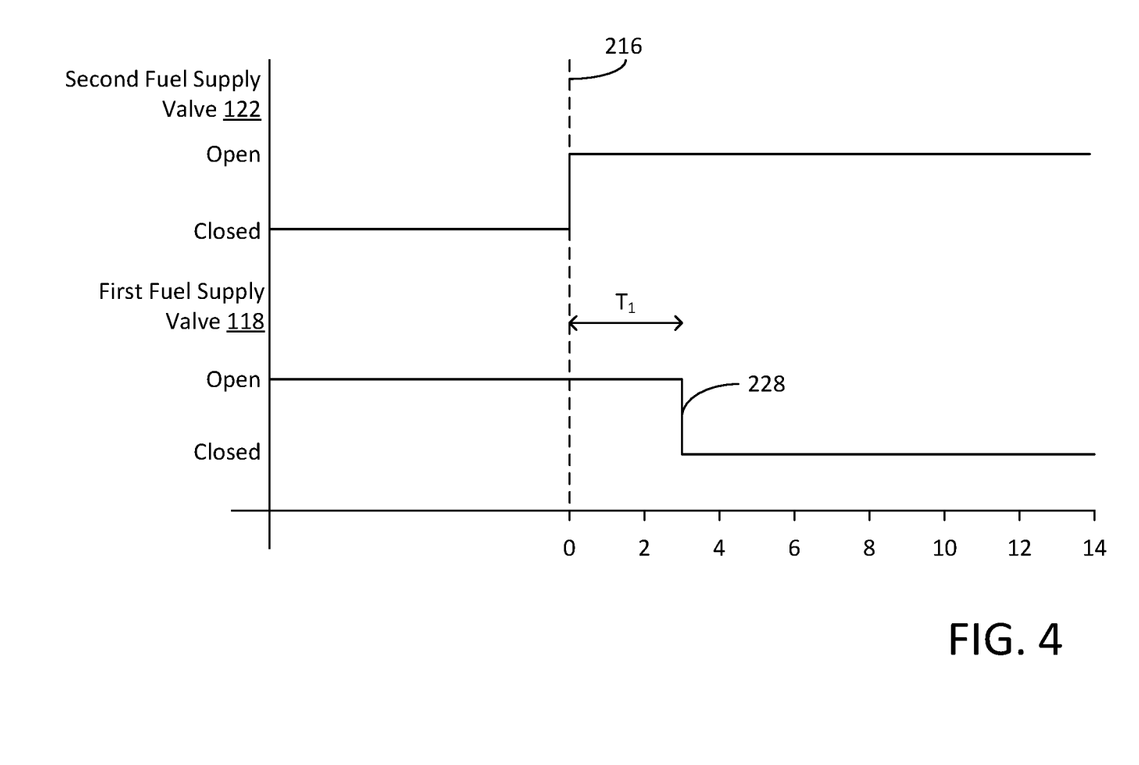
FIG. 4 is a graph illustrating an embodiment of valve switchover timing from the first fuel supply valve to the second fuel supply valve implemented by the fuel switchover control system of FIG. 3.

FIG. 4 illustrates operation of the first and second fuel supply valves 118, 122 as described in steps 216 to 228. The first fuel supply valve 118 is in an open position and the system 200 detects a transition from the first fuel source 60 to the second fuel source 70 (or from the first fuel 58 to the second fuel 62). At step 216 (or at zero seconds), the second fuel supply valve 122 opens. Both the first and second fuel supply valves 118, 122 remain open for the first time period $T_1$ (illustrated in this embodiment as three seconds), as described in step 220. At the conclusion of the first time period $T_1$ (or the first time period $T_1$ elapsing as described in step 224), the first fuel supply valve 118 closes (or is transitioned to a closed position) as described in step 228. The second fuel supply valve 122 remains open to supply the second fuel 62 (or fuel from the second fuel source 70) to the engine 22.

Referring back to FIG. 3, and returning to step 212, if the system 200 determines that the first fuel supply valve 118 is not in the open position (or is in the closed position), or "no," the system 200 determines the second fuel supply valve 122 is in the open position (and the second fuel 62 from the second fuel source 70 is being supplied to the engine 22). The system 200 thus proceeds to step 232.

At step 232, the system 200 opens the first fuel supply valve 118. For example, the engine controller 46 communicates with the first fuel supply valve 118 along the first portion of the fourth communication link 90A, instructing the first fuel supply valve 118 to open. Next, at step 236 the system 200 keeps the fuel supply valves 118, 122 in an open position. In this position, both the first and second fuels 58, 62 are concurrently being supplied to the engine 22. The fuel supply valves 118, 122 are kept open for a second time period $T_2$. The second time period $T_2$ is a programmable (or preprogrammed) time period that is used to measure the amount of time that the fuel supply valves 118, 122 overlap in the open position (or overlap in the concurrent supply of the first and second fuels 58, 62 to the engine 22). The second time period $T_2$ can be at least one second to at least five seconds, and more specifically at least one second to at least three seconds, and more specifically three seconds, and more specifically at least one second. At step 240, the system 200 determines whether the second time period $T_2$ has elapsed. If "no," the amount of time in the second time period $T_2$ has not elapsed, the process returns to step 240 (or repeats). If "yes," the amount of time in the second time period $T_2$ has elapsed, the process proceeds to step 244.

At step 244, the system 200 closes the second fuel supply valve 122. For example, the engine controller 46 communicates with the second fuel supply valve 122 along the second portion of the fourth communication link 90B, instructing the second fuel supply valve 122 to close. Following step 244, the second fuel supply valve 122 is closed, the first fuel supply valve 118 is open, and only the first fuel 58 (or fuel from the first fuel source 60) is being supplied to the engine 22, resulting in cessation of supply (or delivery) of the second fuel 62 to the engine 22. The system 200 then returns to step 208 where the system repeats.

Figure 5:
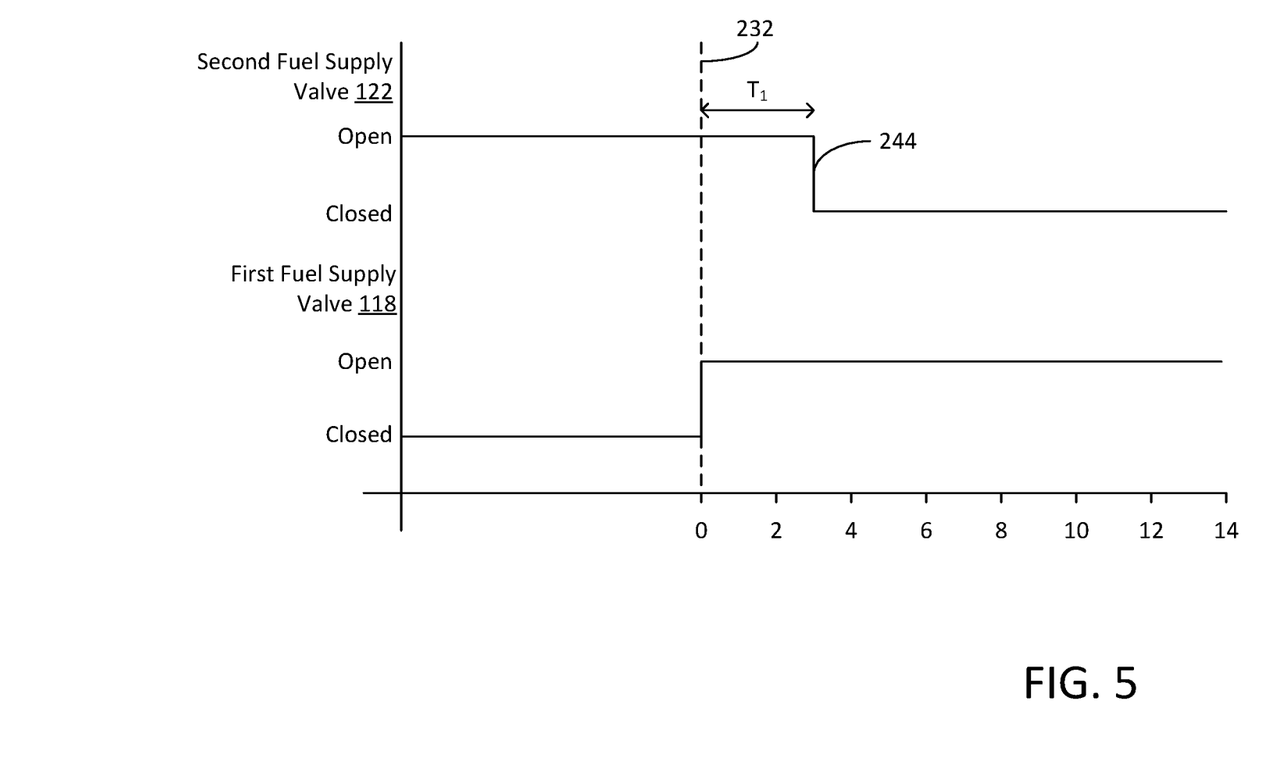
FIG. 5 is a graph illustrating an embodiment of valve switchover timing from the second fuel supply valve to the first fuel supply valve implemented by the fuel switchover control system of FIG. 3.

FIG. 5 illustrates operation of the first and second fuel supply valves 118, 122 as described in steps 232 to 244. The second fuel supply valve 122 is in an open position and the system 200 detects a transition from the second fuel source 70 to the first fuel source 60 (or from the second fuel 62 to the first fuel 58). At step 232 (or at zero seconds), the first fuel supply valve 118 opens. Both the first and second fuel supply valves 118, 122 remain open for the second time period $T_2$ (illustrated in this embodiment as three seconds), as described in step 236. At the conclusion of the second time period $T_2$ (or the second time period $T_2$ elapsing as described in step 240), the second fuel supply valve 122 closes (or is transitioned to a closed position) as described in step 244. The first fuel supply valve 118 remains open to supply the first fuel 58 (or fuel from the first fuel source 60) to the engine 22.

It should be appreciated that steps 212 to 244 can be implemented through a programmable relay that can be added to the system 10. For example, the programmable relay can implement the first time period $T_1$ as a delay (or offset) implemented upon a command from the engine controller 46 to close the first fuel supply valve 118. With the first fuel supply valve 118 in the open position, the second fuel supply valve 122 in the closed position, and a command to transition from the first fuel 58 (supplied through the first fuel supply valve 118) to the second fuel 62 (supplied through the second fuel supply valve 122), the engine controller 46 can simultaneously send commands to open the second fuel supply valve 122 and close the first supply valve 118. The command to open the second fuel supply valve 122 is implemented immediately, while the command to close the first fuel supply valve 118 is delayed by the programmable first time period $T_1$, resulting in both the first and second fuel supply valves 118, 122 being open for the first time period $T_1$. As another example, the programmable relay can implement the second time period $T_2$ as a delay (or offset) implemented upon a command from the engine controller 46 to close the second fuel supply valve 122. With the second fuel supply valve 122 in the open position, the first fuel supply valve 118 in the closed position, and a command to transition from the second fuel 62 (supplied through the second fuel supply valve 122) to the first fuel 58 (supplied through the first fuel supply valve 118), the engine controller 46 can simultaneously send commands to open the first supply valve 118 and close the second fuel supply valve 122. The command to open the first fuel supply valve 118 is implemented immediately, while the command to close the second fuel supply valve 122 is delayed by the programmable second time period $T_2$, resulting in both the first and second fuel supply valves 118, 122 being open for the second time period $T_2$.

Various additional features and advantages of the disclosure are set forth in the following claims.

What is claimed is:

1. A movable electrical generation system comprising:
 a generator operable to produce a supply of electrical energy;
 a prime mover operable to drive the generator;
 a first fuel provided from a first fuel source;

a second fuel provided from a second fuel source, the second fuel different from the first fuel; and a fuel selector valve assembly operably connected to the first fuel source, the second fuel source, and the prime mover, the fuel selector valve assembly configured to receive the first fuel and the second fuel, and operable to selectively supply the first fuel and the second fuel to the prime mover, wherein the fuel selector valve assembly is configured to operate in a first position to supply the first fuel to the prime mover, wherein the fuel selector valve assembly is configured to operate in a second position to supply the second fuel to the prime mover, wherein in response to a transition from the first position to the second position, the fuel selector valve assembly is configured to supply both the first fuel and the second fuel to the prime mover for a first time period, and upon the first time period elapsing the fuel selector valve assembly transitions to operate in the second position; and wherein in response to a transition from the second position to the first position, the fuel selector valve assembly is configured to supply both the first fuel and the second fuel to the prime mover for the first time period, and upon the first time period elapsing the fuel selector valve transitions to operate in the first position.

2. The movable electrical generation system of claim 1, wherein the fuel selector valve assembly includes a first fuel supply valve and a second fuel supply valve.

3. The movable electrical generation system of claim 2, wherein in the first position, the first fuel supply valve is open and the second fuel supply valve is closed, wherein in the second position, the first fuel supply valve is closed and the second fuel supply valve is open, and in the transitions from the first and second positions, the first fuel supply valve and the second fuel supply valve are open during the first time period.

4. The movable electrical generation system of claim 1, wherein the first time period is at least one second.

5. The movable electrical generation system of claim 1, wherein the first time period is one second to five seconds.

6. The movable electrical generation system of claim 1, wherein the first time period is three seconds.

7. The movable electrical generation system of claim 1, further comprising a control system in communication with the fuel selector valve assembly, the control system configured to instruct the fuel selector valve assembly to operate in the first position, the second position, or in the transitions from the first and second positions.

8. The movable electrical generation system of claim 7, wherein the control system is associated with a prime mover controller.

9. The movable electrical generation system of claim 1, wherein the first fuel is raw wellhead natural gas.

10. The movable electrical generation system of claim 1, wherein the first fuel is natural gas.

11. The movable electrical generation system of claim 10, wherein the second fuel is liquid propane.

12. A method of controlling a supply of one of a plurality of different fuel sources to a movable electrical generation system comprising:

supplying one of a first fuel and a second fuel to a prime mover as a selected fuel, the first fuel being different than the second fuel; and transitioning from the first fuel as the selected fuel to the second fuel as the selected fuel by concurrently providing the first fuel and the second fuel to the prime mover before terminating the supply of the first fuel.

13. The method of claim 12, wherein the transitioning step includes:

transitioning from the first fuel as the selected fuel to the second fuel as the selected fuel by opening a second fuel supply valve, and delaying closing of a first fuel supply valve by a programmable first time period, and in response to the programmable first time period elapsing closing the first fuel supply valve.

14. The method of claim 12, further comprising transitioning from the second fuel as the selected fuel to the first fuel as the selected fuel by concurrently providing the first fuel and the second fuel to the prime mover before terminating the supply of the second fuel.

15. The method of claim 14, wherein the step of transitioning from the second fuel as the selected fuel to the first fuel as the selected fuel includes:

transitioning from the second fuel as the selected fuel to the first fuel as the selected fuel by opening a first fuel supply valve, and delaying closing of a second fuel supply valve by a programmable second time period, and in response to the programmable second time period elapsing closing the second fuel supply valve.

16. A movable electrical generation system comprising:

a generator operable to produce a supply of electrical energy;

a prime mover operable to drive the generator;

a fuel selector valve assembly operable to deliver a selected fuel to the prime mover, the selected fuel including a first fuel or a second fuel;

a controller configured to actuate the fuel selector valve assembly to change the selected fuel between the first fuel and the second fuel, wherein in response to the change in the selected fuel between the first fuel and the second fuel, the controller instructs the fuel selector valve assembly to concurrently supply both the first fuel and the second fuel to the prime mover for a first time period, and in response to the first time period being elapsed the controller instructs the fuel selector valve assembly to stop delivery of one of the first fuel or the second fuel to the prime mover.

17. The movable electrical generation system of claim 16, wherein the fuel selector valve assembly includes a first fuel supply valve and a second fuel supply valve.

18. The movable electrical generation system of claim 17, wherein in response to the selected fuel being the first fuel, the controller actuates the fuel selector valve assembly to open the first fuel supply valve and close the second fuel supply valve, wherein in response to the selected fuel being the second fuel, the controller actuates the fuel selector valve assembly to close the first fuel supply valve and open the second fuel supply valve, and wherein in response to the change in the selected fuel between the first fuel and the second fuel, the controller instructs the fuel selector valve assembly to concurrently open the first fuel supply valve and the second fuel supply valve during the first time period, and in response to the first time period being elapsed the controller instructs the fuel selector valve assembly to close one of the first fuel supply valve or the second fuel supply valve.

19. The movable electrical generation system of claim 16, wherein the first fuel is different than the second fuel.

20. The movable electrical generation system of claim 16, wherein the first fuel is natural gas and the second fuel is liquid propane.

\* \* \* \* \*